United States Patent
Liu

(12)
(10) Patent No.: US 6,218,853 B1
(45) Date of Patent: Apr. 17, 2001

(54) CIRCUIT ARRANGEMENT FOR SIMULATING ALTERNATING CURRENT LOAD

(76) Inventor: Daniel Liu, 4F, No. 10, Alley 59, Lane 42, Min Chuan Road, Hsien Tien (TW)

(*) Notice: Subject to any disclaimer, the term of this patent is extended or adjusted under 35 U.S.C. 154(b) by 0 days.

(21) Appl. No.: 09/209,011

(22) Filed: Dec. 11, 1998

(51) Int. Cl.$^7$ ................................................ G01R 31/36
(52) U.S. Cl. ........................ 324/771; 263/132; 323/237
(58) Field of Search .......................... 324/771; 323/337, 323/211, 237; 363/132

(56) References Cited

U.S. PATENT DOCUMENTS 5,103,390 * 4/1992 Liu .................................... 324/123 C
5,994,883 * 11/1999 Liu ...................................... 323/237

* cited by examiner

*Primary Examiner*—Safet Metjahic
*Assistant Examiner*—J. Kerveros
(74) *Attorney, Agent, or Firm*—Dougherty & Troxell

(57) ABSTRACT

A circuit arrangement for simulating an alternating current load. The simulating circuit includes a current waveform generating circuit capable of generating a phase control signal with a phase angle coherent, lagged, or leading to that of the alternating current power source voltage. A voltage and current phase control circuit generates a first and second switching control signals according to the phase control signal generated by the current waveform generating circuit and a series of counting pulses generated by a voltage zero-crossing detecting circuit. The switching control signals are used to control a switch circuit so as to generate a power source current with a phase angle coherent, lagged, or leading to the phase angle of the power source voltage.

5 Claims, 4 Drawing Sheets

CIRCUIT ARRANGEMENT FOR SIMULATING ALTERNATING CURRENT LOAD

BACKGROUND OF THE INVENTION

1. Field of the Invention

The present invention relates to a circuit design for simulating an alternating current load, and more especially to an alternating current load simulating device capable of simulating a resistive load, an inductive load, or a capacitive load.

2. Description of the Prior Art

In the current industrial field, alternating current power source devices are frequently employed in electric devices. Various alternating current power source devices are currently available in the industry, such as an uninterrupted power supply, an inverter, a voltage regulator, an amplifier, etc. In order to test the electrical characteristics of the alternating current power supply, it is necessary to substantially connect electrical equipment, such as a lamp or a motor, to the power source device. Since various kinds of alternating current loads are necessarily prepared for being connected to the alternating current power source device, it is inconvenient and inefficient during testing.

In order to overcome the above problems of the prior art, an alternating current load simulating device is therefore developed to simulate the real electrical equipment. However, the circuit design of the prior art alternating current load simulating device is only suitable for testing the resistive load, such as a heater or a bulb lamp. Although some of the prior art alternating current load simulating devices are designed to have the capability of simulating an inductive or a capacitive load, a combination of real resistors, capacitors and inductors to get the desired electric load. The problem of this prior art is that it is not easy to get the load value exactly, and it is difficult to change or adjust the load value conveniently.

SUMMARY OF THE INVENTION

Accordingly, the primary object of the present invention is to provide a circuit design of an alternating current load simulating device which can be employed to simulate various alternating current loads including resistive, inductive, and capacitive load. The simulating device of the present invention is suitable to simulate a real electronic load for various alternating current power source devices, such as uninterrupted power supply, inverter, voltage regulator, amplifier, and other alternating current power source devices.

Another object of the present invention is to provide an alternating current load simulating device with different load type adjustable by the user as desired. The simulating device comprises a switch circuit, a rectifying circuit, a voltage to current converting circuit, a voltage zero-crossing detecting circuit, a current waveform generating circuit, a current phase setting circuit, a current level adjusting circuit 71, a current level setting circuit 71, and a voltage and current phase control circuit. In addition to the simulation of resistive, inductive, and capacitive load, the present invention is also suitable to simulate any loads with different electrical features, such as an electrical composite load with inductive and capacitive features. The power factor controllable by the present invention is within a range of −1.000~0~+1.000.

The present invention will be better understood and its numerous objects and advantages will become apparent to those skilled in the art by referencing to the following drawings in which:

DETAILED DESCRIPTION OF THE PREFERRED EMBODIMENT

Figure 1:
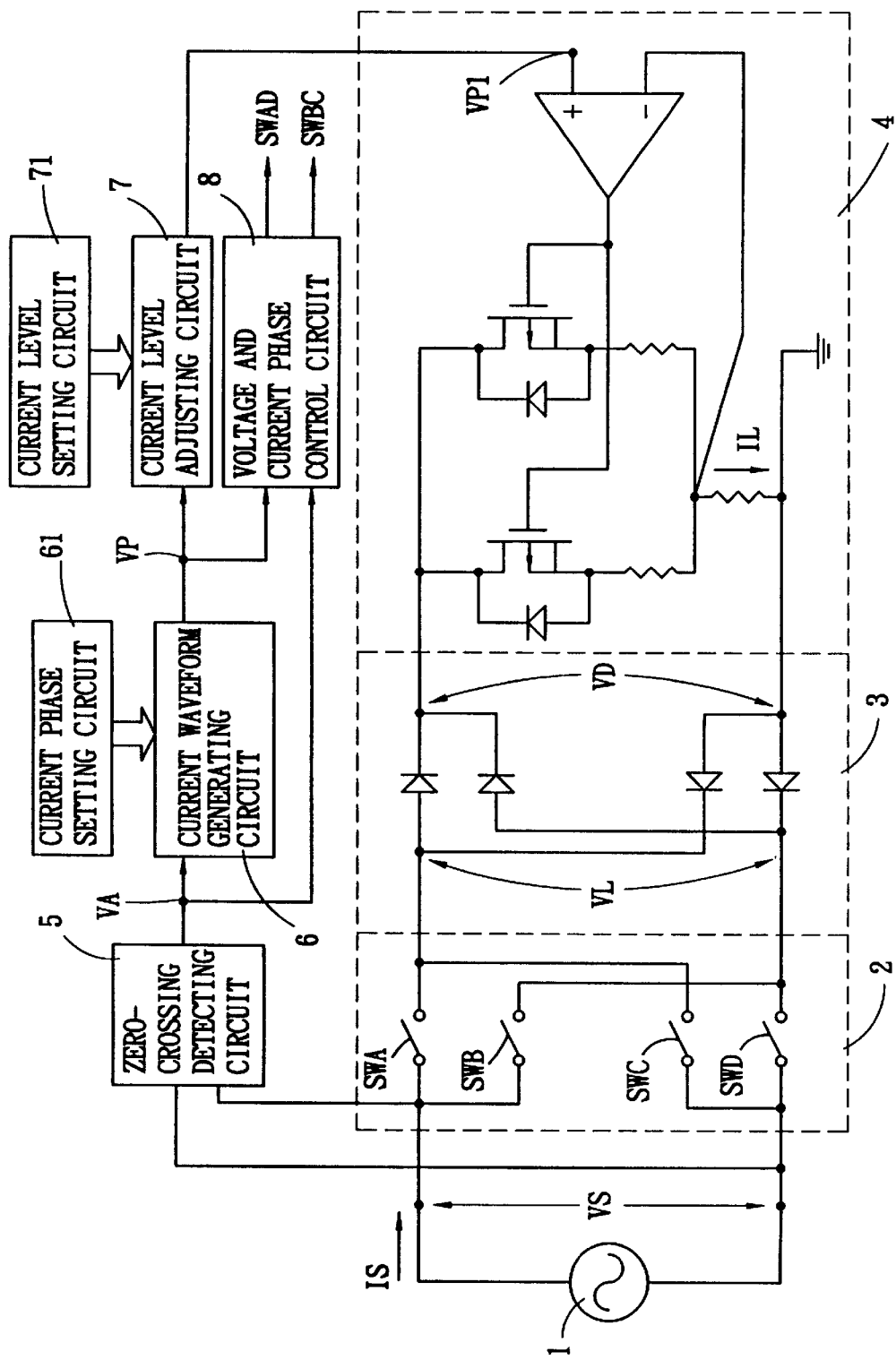
FIG. 1 shows a circuit diagram of a preferred embodiment according to the present invention.

As shown in FIG. 1, the circuit diagram of the present invention is disclosed. The alternating current load simulating device of the present invention comprises a switch circuit 2, a rectifying circuit 3, a voltage to current converting circuit 4, a voltage zero-crossing detecting circuit 5, a current waveform generating circuit 6, a current phase setting circuit 61, a current level adjusting circuit 7, a current level setting circuit 71, and a voltage and current phase control circuit 8.

The switch circuit 2 is arranged across an external alternating current power source 1, which includes four switches SWA~SWD. The first switch SWA and the fourth switch SWD are paired and are controlled by a first switching control signal SWAD outputted from the voltage and current phase control circuit 8. The second switch SWB and the third switch SWC are paired and are controlled by a second switching control signal SWBC outputted from the voltage and current phase control circuit 8. Thus, when the voltage VS of the alternating current power source 1 and its current waveform are in phase, a current loop is formed through the first switch SWA and the fourth switch SWD. Alternatively, when the voltage VS of the alternating current power source 1 and its current waveform are out of phase, a current loop is formed through the third switch SWC and the second switch SWB.

The rectifying circuit 3 is connected to the two output ends of the switch circuit 2 in parallel for rectifying the alternating current voltage VL outputted from the switch circuit 2 so as to generate a direct current voltage VD at its output ends. The rectifying circuit 3 includes four diodes and a full wave rectifying circuit.

The voltage to current converting circuit 4 is connected to the output ends of the rectifying circuit 3. Under the control of the phase control circuit, the direct current voltage VD outputted from the rectifying circuit 3 is converted into a load current IL.

The two input ends of the voltage zero-crossing detecting circuit 5 are connected across the alternating current power source 1 for detecting a zero-crossing point of the alternating current power source voltage. That is, when the phase angle of the alternating current power source 1 is at zero point, it can be detected by the voltage zero-crossing detecting circuit 5. Each time the alternating current power source 1 sends out a full cycle of sine wave, the voltage zero-crossing detecting circuit 5 will output a counting pulse at its output end. So, a series of counting pulses VA are generated at the output end of the voltage zero-crossing detecting circuit 5.

The current waveform generating circuit 6 receives the counting pulses VA from the voltage zero-crossing detecting circuit 5 and then generates a phase control signal VP with a phase angle coherent, lagged or leading to the phase angle of the voltage VS depending on the setting of the current phase setting circuit 61. In the embodiment of the present invention, the current waveform generating circuit 6 is composed of a waveform data memory, a counter and a digital to analog converter. By means of the current waveform generating circuit 6, an output waveform with a phase difference to that of the voltage VS of the alternating current power source may be easily generated.

The level of phase control signal VP generated by the current waveform generating circuit 6 may be adjusted by adjusting the current level circuit 7 to a preset level.

The two input ends of the voltage and current phase control circuit 8 are arranged to receive the phase control signal VP generated by the current waveform generating circuit 6 and the counting pulse VA generated by the voltage zero-crossing detecting circuit 5 respectively. The first switching control signal SWAD and the second switching control signal SWBC are then generated at its output ends.

The alternating current loads may be a resistive load, a capacitive load, or an inductive load. Thus, the simulating device must have capability of simulating these electrical features, which will be described in detail as follows:

1. Simulating a Resistive Load

Figure 2:
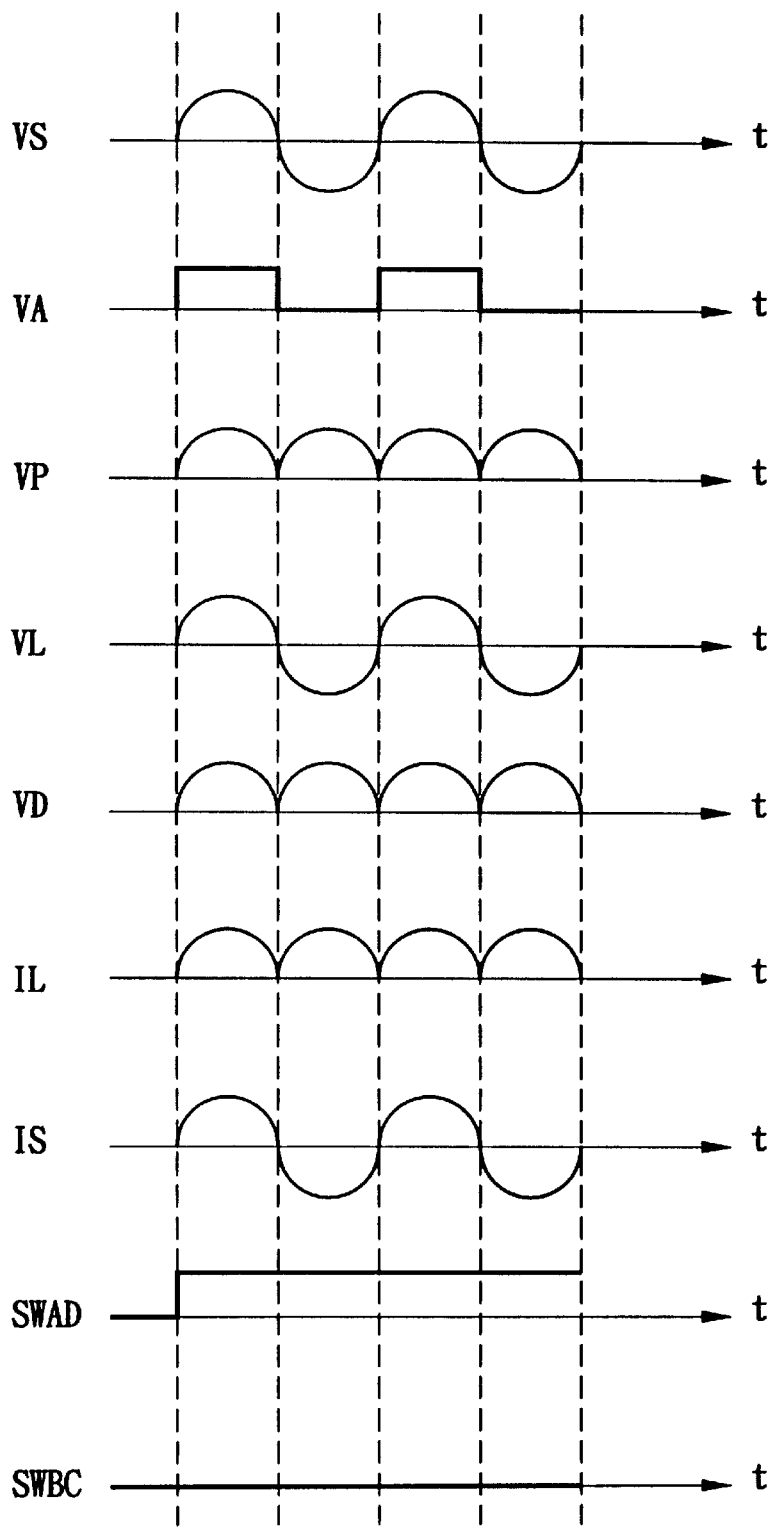
FIG. 2 shows waveforms of the related nodes of FIG. 1 when a resistive load is simulated according to the present invention.

The electrical feature of a resistive load is that the electrical phase angle of the current passing through the load is coherent to that of the voltage across the load. Therefore, in the present invention, an alternating current IS with a phase angle coherent to that of the alternating current power source voltage VS must be generated. FIG. 2 shows waveforms of the related nodes of FIG. 1 when a resistive load is simulated according to the present invention.

The two input ends of the voltage zero-crossing detecting circuit 5 are connected across the alternating current power source 1, and the output end thereof can generate a series of counting pulses VA which will be sent to the current waveform generating circuit 6. Since a resistive load is simulated, the current phase setting circuit 61 is set to simulate a resistive circuit. That is, the current phase setting circuit 61 generates a phase control waveform VP with a phase angle coherent to that of the alternating current power source voltage VS.

The phase control waveform VP and the counting pulse VA are sent to the voltage and current phase control circuit 8, and then the first switching control signals SWAD and the second switching control signal SWBC are generated at output ends of the voltage and current phase control circuit 8. The voltage and current phase control circuit 8 may be designed using a well known logic circuit, such as an exclusive OR gate.

The first switching control signal SWAD is employed to control the ON/OFF states of the first switch SWA and the fourth switch SWD of the switch circuit 2. The second switching control signal SWBC is employed to control the ON/OFF states of the second switch SWB and the third switch SWC of the switch circuit 2.

In simulating the resistive load, the first switching control signal SWAD is always in a logical high level state, and the second switching control signal SWBC is always in a logical low level state. Therefore, a load voltage VL with a phase angle coherent to that of the alternating current power source voltage VS can be generated at the output ends of the switch circuit 2. The load voltage VL is then rectified by the rectifying circuit 3 so as to generate a rectified output voltage VD.

The rectified output voltage VD is converted into a load current IL via the voltage to current converting circuit 4, under control of the phase control signal VP. Since the load current IL has a phase angle coherent to that of the voltage VS of the alternating current power source, a power source current IS with a phase angle coherent to the alternating current power source voltage VS is substantially obtained.

2. Simulating an Inductive Load

Figure 3:
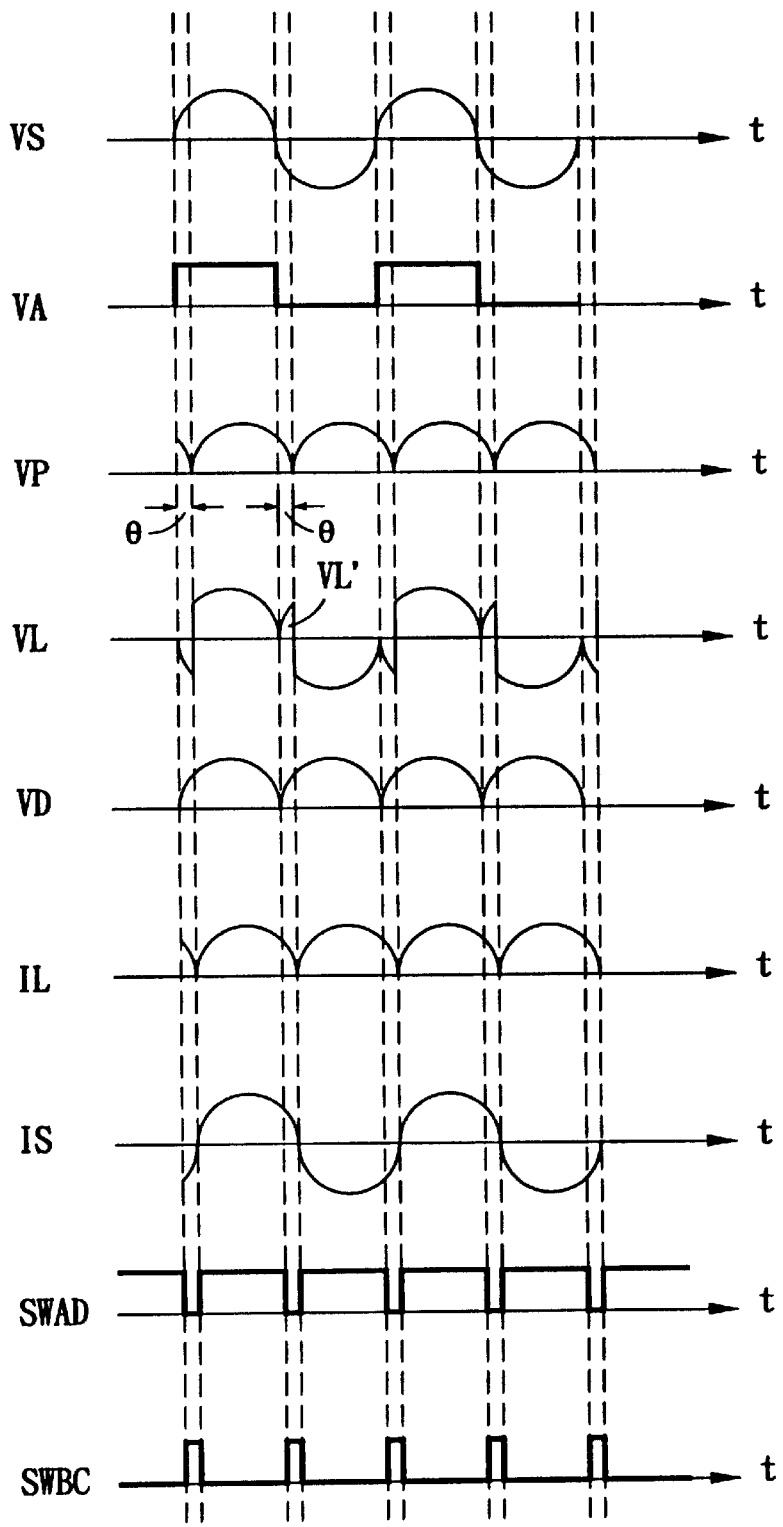
FIG. 3 shows waveforms of the related nodes of FIG. 1 when an inductive load is simulated according to the present invention.

The electrical feature of an inductive load is that the current passing through the load lags the applied voltage across the load by an electrical phase angle. Therefore, in the present invention, an alternating current IS with a phase angle lagged to that of the alternating current power source voltage VS must be generated. FIG. 3 shows waveforms of the related nodes of FIG. 1 when an inductive load is simulated according to the present invention.

The two input ends of the voltage zero-crossing detecting circuit 5 are connected across the alternating current power source 1, while the output end thereof may send a series of counting pulses VA. The counting pulses VA are then sent to the current waveform generating circuit 6. Since an inductive load is simulated, the current phase setting circuit 61 is set as an inductive circuit. Therefore, the current phase setting circuit 61 will generate a phase control waveform VP with a phase angle θ lagged to that of the alternating current power source voltage VS according to the setting of the current phase setting circuit 61.

The phase control waveform VP and the counting pulse VA are respectively sent to the voltage and current phase control circuit 8, and then the voltage and current phase control circuit 8 will output a first switching control signals SWAD and a second switching control signal SWBC at its output.

The first switching control signal SWAD is employed to control the ON/OFF states of the first switch SWA and the fourth switch SWD of the switch circuit 2. The second switching control signal SWBC is employed to control the ON/OFF states of the second switch SWB and the third switch SWC.

By means of the switching control of the control signals SWAD and SWBC to the switches SWA~SWD of the switch circuit 2, a load voltage VL is generated at the output end of the switch circuit 2. For example, in the positive half cycle of a first sine wave of the voltages VS, the alternating current power source VS and the phase control waveform VP are out of phase with a phase shift θ from VS zero volt to VP zero volt duration. The first and fourth switches SWA and SWD are opened, while the second and the third switches SWB and SWC are closed. At this time, the voltage VS of the alternating current power source 1 is sent to the input end of the rectifying circuit 3. After the above phase shift θ period, when the voltage VS of the alternating current power source 1 and phase control waveform VP are out of phase with a phase shift θ from VP zero volt to VS zero volt duration, the first and fourth switches SWA and SWD are closed, while the second and third switches SWB and SWC are opened.

Thereafter, when the phase angle of the current is zero, the first and fourth switches SWA and SWD are opened again, while the second and third switches SWB and SWC are closed. In this period of time, the output end of the switch circuit 2 will generate a positive load voltage VL'. Thus, the same polarity of VL and IS can be obtained at any time by the switch circuit 2. So, a load voltage VL as shown in the drawing can be obtained at the output end of the switch circuit 2.

The load voltage VL is further rectified by a rectifying circuit 3 so to generate a rectified output voltage VD. The rectified output voltage VD is then sent to the two ends of the voltage to current converting circuit 4.

Then, by the controlling of the phase control signal VP, the voltage to current converting circuit 4 will generate a load current IL. Since the phase angle of the load current IL is lagged to that of the voltage VS of the alternating current power source with a phase angle θ, thus a power source current IS with a lagged phase angle to the alternating current power source voltage VS is obtained.

3. Simulating a Capacitive Load

Figure 4:
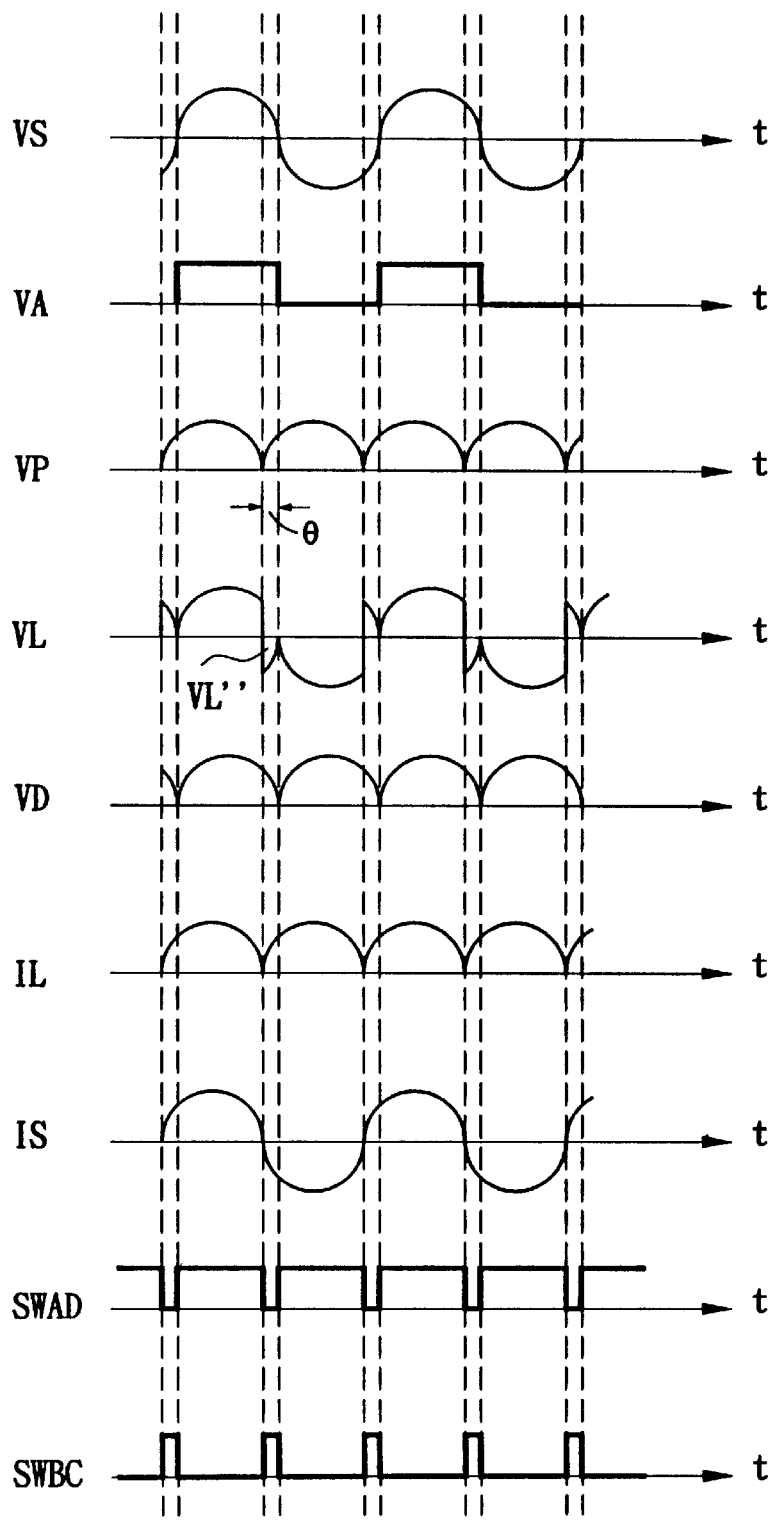
FIG. 4 shows waveforms of the related nodes of FIG. 1 when a capacitive load is simulated according to the present invention.

The electrical feature of a capacitive load is that the current passing through the load leads the applied voltage across the load by an electrical phase angle. Therefore, in the present invention, an alternating current IS with a phase angle led to that of the alternating current power source voltage VS must be generated. FIG. 4 shows waveforms of the related nodes of FIG. 1 when a capacitive load is simulated according to the present invention.

The two input ends of the voltage zero-crossing detecting circuit 5 are connected across the alternating current power source 1, while the output end thereof may send a series of counting pulses VA. The counting pulses VA are then sent to the current waveform generating circuit 6. Since a capacitive load is simulated, the current phase setting circuit 61 is set as an capacitive circuit. Therefore, the current phase setting circuit 61 will generate a phase control waveform VP with a phase angle θ led to that of the alternating current power source voltage VS according to the setting of the current phase setting circuit 61.

The phase control waveform VP and the counting pulse VA are respectively sent to the voltage and current phase control circuit 8, and then the voltage and current phase control circuit 8 will output a first switching control signals SWAD and a second switching control signal SWBC at its output.

The first switching control signal SWAD is employed to control the ON/OFF states of the first switch SWA and the fourth switch SWD of the switch circuit 2. The second switching control signal SWBC is employed to control the ON/OFF states of the second switch SWB and the third switch SWC.

By means of the switching control of the control signals SWAD and SWBC to the switches SWA~SWD of the switch circuit 2, a load voltage VL is generated at the output end of the switch circuit 2. For example, in the positive half cycle of a first sine wave of the voltages VS, the first and fourth switches SWA and SWD are closed, while the second and the third switches SWB and SWC are opened. At this time, the voltage VS of the alternating current power source 1 is sent to the input end of the rectifying circuit 3. When the voltage VS of the alternating current power source 1 has reduced to a certain value where the current value is zero, the alternating current power source VS and the phase control waveform VP are out of phase with a phase shift θ from VP zero volt to VS zero volt duration. The first and fourth switches SWA and SWD are opened, while the second and third switches SWB and SWC are closed. In this period of time, the output end of the switch circuit 2 will generate a negative load voltage VL".

Thereafter, when the phase angle of the voltage VS is zero, the first and fourth switches SWA and SWD are closed again, while the second and third switches SWB and SWC are opened. Thus, the same polarity of VL and IS can be obtained at any time by the switch circuit 2. So, a load voltage VL as shown in the drawing can be obtained at the output end of the switch circuit 2.

The load voltage VL is further rectified by a rectifying circuit 3 so to generate a rectified output voltage VD. The rectified output voltage VD is then sent to the two ends of the voltage to current converting circuit 4.

Then, by the controlling of the phase control signal VP, the voltage to current converting circuit 4 will generate a load current IL. Since the phase angle of the load current IL is led to that of the voltage VS of the alternating current power source with a phase angle θ, thus a power source current IS with a leading phase angle to the alternating current power source voltage VS is obtained.

Although a preferred embodiment of the present invention has been described to illustrate the present invention, it is apparent that changes and modifications in the specifically described embodiment can be carried out without departing from the scope of the invention which is intended to be limited only by the appended claims.

What is claimed is:

1. An alternating current load simulating device for generating a load current with a phase difference to an electrical phase angle of an alternating current power source voltage, comprising:

a voltage zero-crossing detecting circuit electrically connected across the alternating current power source voltage for generating a counting pulse at each positive half cycle of the alternating current power source voltage;

a current waveform generating circuit coupled to the voltage zero-crossing detecting circuit for receiving the counting pulse and then generating a phase control signal;

a voltage and current phase control circuit for receiving the phase control signal generated by the current waveform generating circuit and the counting pulse of the voltage zero-crossing detecting circuit, and then generating a first and a second switching control signals;

a switch circuit having two input ends coupled to the alternating current power source voltage in parallel for receiving the alternating current power source voltage and an output end, the switch circuit comprising a first switch and a fourth switch being paired and controlled by the first switching control signal, and a second switch and a third switch being paired and controlled by the second switching control signal, to generate a load voltage at the output end of the switch circuit;

a rectifying circuit coupled to the output end of the switch circuit for rectifying the load voltage generated by the switch circuit and then generate a direct current voltage; and a voltage to current converting circuit for converting the direct current voltage outputted from the rectifying circuit into a load current with a phase difference to the phase angle of the alternating current power source voltage under control of the phase control signal generated by the current waveform generating circuit.

2. The alternating current load simulating device according to claim 1, further comprising a current level adjusting circuit coupled to the current waveform generating circuit for adjusting the phase control signal to a preset signal level.

3. The alternating current load simulating device according to claim 1, wherein the load current has a phase angle coherent to the phase angle of the alternating current power source voltage.

4. The alternating current load simulating device according to claim 1, wherein the load current has a phase angle lagged to the phase angle of the alternating current power source voltage.

5. The alternating current load simulating device according to claim 1, wherein the load current has a phase angle leading to the phase angle of the alternating current power source voltage.

* * * * *